United States Patent [19]
Okada

[11] Patent Number: 5,822,505
[45] Date of Patent: Oct. 13, 1998

[54] DATA PROCESSING APPARATUS

[75] Inventor: Kunio Okada, Kawasaki, Japan

[73] Assignee: Canon Kabushiki Kaisha, Tokyo, Japan

[21] Appl. No.: 919,290

[22] Filed: Aug. 28, 1997

Related U.S. Application Data

[63] Continuation of Ser. No. 473,992, Jun. 7, 1995, abandoned, which is a continuation of Ser. No. 283,660, Aug. 1, 1994, which is a continuation of Ser. No. 40,585, Mar. 31, 1993, abandoned, which is a continuation of Ser. No. 750,235, Aug. 20, 1991, abandoned, which is a continuation of Ser. No. 390,288, Aug. 7, 1989, abandoned.

[30]     Foreign Application Priority Data

Aug. 13, 1988 [JP] Japan ................................... 63-202518

[51] Int. Cl.$^6$ .................................................... G06K 15/00
[52] U.S. Cl. ............................................ 395/113; 395/114
[58] Field of Search ..................................... 395/113, 114, 395/115, 116, 834, 888, 835, 836, 876, 892–894; 345/202; 400/61, 62; 358/449, 261.4, 462, 467, 426, 430, 444, 404; 382/232

[56]              References Cited

U.S. PATENT DOCUMENTS

| | | | |
|---|---|---|---|
| 4,527,252 | 7/1985 | Donohue et al. | 364/900 |
| 4,571,069 | 2/1986 | Kimura et al. | 346/154 |
| 4,772,955 | 9/1988 | Kurahayashi et al. | 358/257 |
| 4,845,569 | 7/1989 | Kurahayashi et al. | 358/400 |
| 4,860,119 | 8/1989 | Maniwa et al. | 358/296 |
| 4,881,180 | 11/1989 | Nishiyama | 395/114 |
| 5,008,949 | 4/1991 | Arimoto | 382/56 |
| 5,018,081 | 5/1991 | Yamaguchi et al. | 395/113 |
| 5,047,955 | 9/1991 | Shope et al. | 395/114 |

*Primary Examiner*—Arthur G. Evans
*Attorney, Agent, or Firm*—Fitzpatrick, Cella, Harper & Scinto

[57]              ABSTRACT

A data processing apparatus includes an input unit for inputting printing data, a processing unit for processing the printing data input from the input unit and outputting image data, a storage unit for storing the image data, and a setting unit for arbitrarily setting an area capable of storing the image data stored in the storage unit.

49 Claims, 6 Drawing Sheets

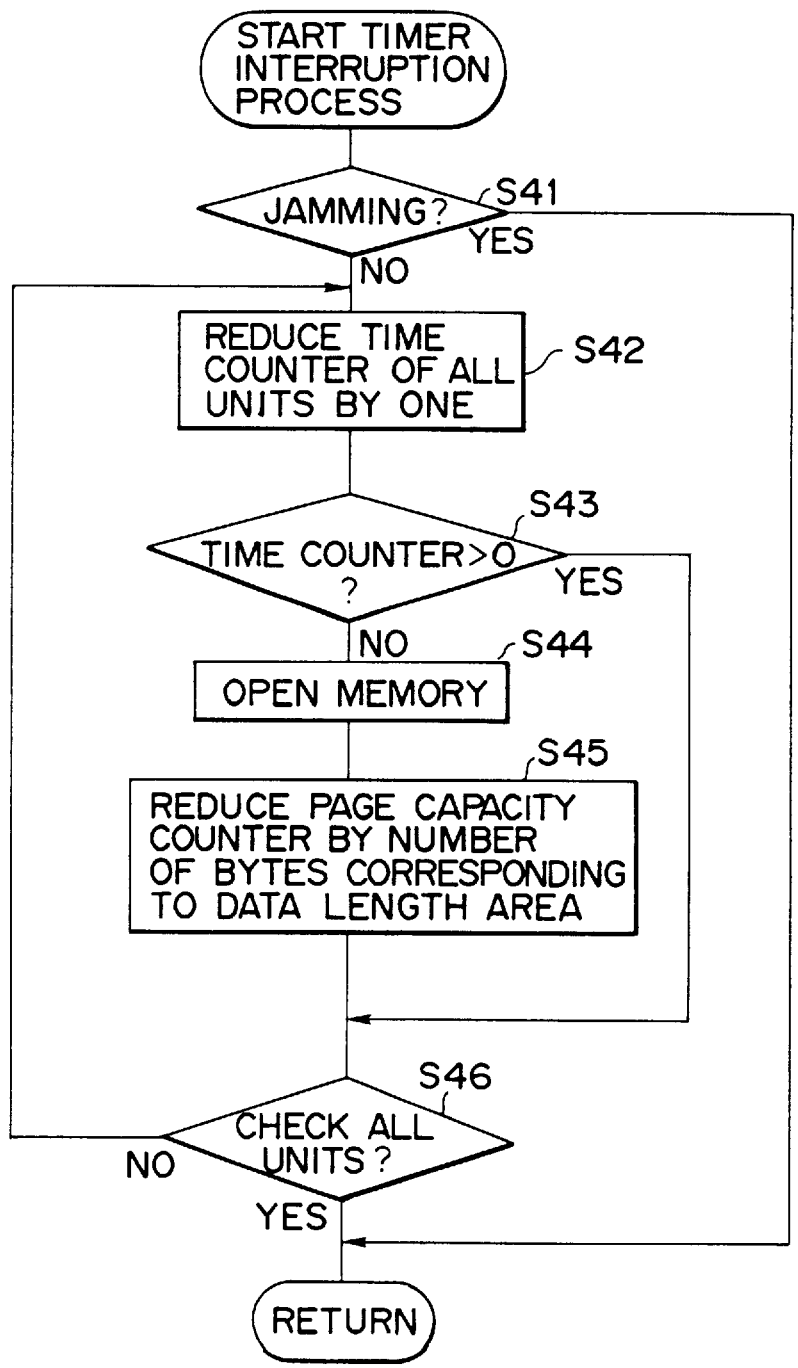

DATA PROCESSING APPARATUS

This application is a continuation of application Ser. No. 08/473,992, filed Jun. 7, 1995, abandoned, which is a continuation of application Ser. No. 08/283,660, filed Aug. 1, 1994, which is a continuation of application Ser. No. 08/040,585, filed Mar. 31, 1993, abandoned, which is a continuation of application Ser. No. 07/750,235, filed Aug. 20, 1991, abandoned, which is a continuation of application Ser. No. 07/390,288 filed Aug. 7, 1989, abandoned.

BACKGROUND OF THE INVENTION

1. Field of the Invention

The present invention relates to a data processing apparatus for processing print data, image data, or the like.

2. Related Background Art

In a conventional printing apparatus of this type, in order to increase printing speed, a page edit process for the next page is sequentially performed during printing, and information of a plurality of pages is stored in a storage means.

In addition, print data input from a data source such as a host computer is temporarily stored in the storage means so that the print data need not be resent therefrom even if a jam (paper jamming) occurs.

In the printing apparatus of this type, a memory capacity expected to be necessary in accordance with the length of a conveyor path of a recording medium or the like is used to save page data.

In the conventional apparatus as described above, when various sizes of recording media can be used, a memory save capacity for page data is determined in accordance with the maximum size. Therefore, since a large memory save capacity is prepared for even a small recording medium, an unnecessary memory capacity is used. Especially when page data to be processed is bit map image data, a memory capacity is wasted. In addition, when a printing apparatus is a perfecting press (both side printer), a data amount to be saved is twice that of a single press (single side printer), resulting in a serious problem of a memory capacity.

In the above conventional technique, when a predetermined part of a memory area is used to save page data while the other part is used to store registration data such as a font down load from a data source or the like, increases in efficiency of a page edit process and printing speed are limited because the page data save area is fixedly set.

SUMMARY OF THE INVENTION

It is an object of the present invention to eliminate the above conventional drawbacks.

It is another object of the present invention to improve a data processing apparatus.

It is still another object of the present invention to provide a data processing apparatus capable of effectively utilizing a memory.

It is still another object of the present invention to provide a data processing apparatus capable of using a memory in accordance with a purpose of an operator.

It is still another object of the present invention to provide a data processing apparatus capable of increasing printing efficiency.

It is still another object of the present invention to provide a data processing apparatus for outputting image data, which has improved functions.

It is still another object of the present invention to provide a data processing apparatus capable of selecting a memory utilization form if necessary.

It is still another object of the present invention to provide a data processing apparatus capable of dealing with an abnormality such as a jam of a printing unit.

It is still another object of the data processing apparatus capable of reducing a load on a data generating source.

It is still another object of the present invention to provide a data processing apparatus capable of storing a required amount of print data, image data, or the like.

It is still another object of the present invention to provide a data processing apparatus capable of improving functions of a printing apparatus.

The above and other objects of the present invention will be apparent from the description and claims taken in conjunction with the accompanying drawings.

BRIEF DESCRIPTION OF THE DRAWINGS

FIG. 7 is a flow chart for explaining a timer interruption process routine periodically executed by a timer interruption signal in the embodiment.

DETAILED DESCRIPTION OF THE PREFERRED EMBODIMENT

Figure 1:
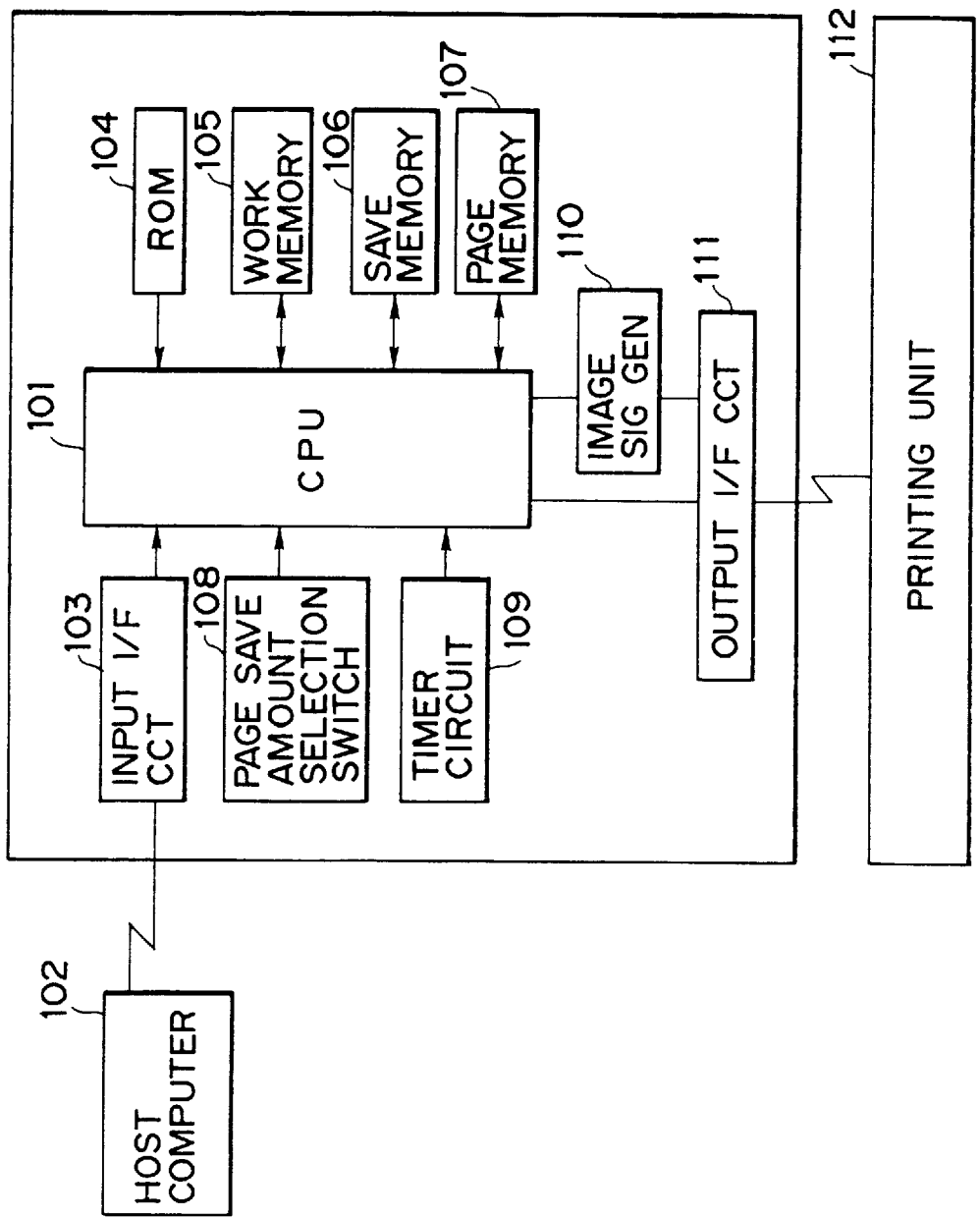
FIG. 1 is a block diagram showing an arrangement of a controller of a laser beam printer according to an embodiment of the present invention.

An embodiment of the present invention will be described in detail with reference to the accompanying drawings.

The controller comprises a CPU 101, an input I/F (interface) circuit 103, a ROM 104, a work memory 105, a save memory 106, a page memory 107, a page save amount selection switch 108, a timer circuit 109, an image signal generator 110, and an output I/F circuit 111.

The CPU 101 performs control of the entire laser printer, analysis of input data, and the like. The input I/F circuit 103 receives data transmitted from a host computer 102 as a data source and transmits the data to the CPU 101. The ROM 104 stores control programs of the laser printer shown in FIGS. 5 to 7, dot pattern information of characters corresponding to a character code in the data transmitted from the host computer 102, and the like.

Figure 4:
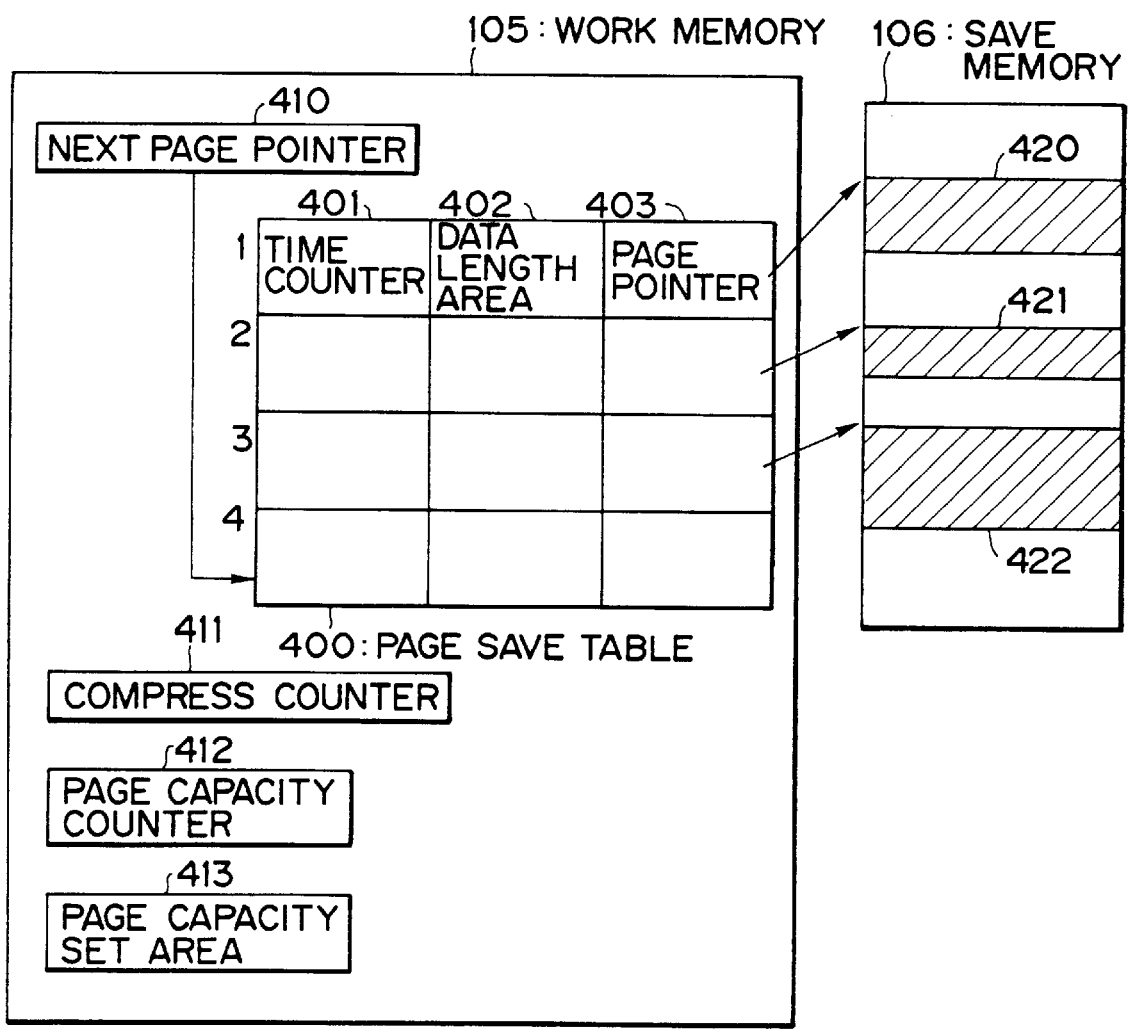
FIG. 4 is a schematic view showing a data format of a work memory utilized by a control program and a relationship between the work memory and a save memory in the embodiment.

The work memory 105, the save memory 106, and the page memory 107 are constituted by conventional RAMs. The work memory 105 stores counters or tables for the control program as shown in FIG. 4. The save memory 106 stores various registration information (down load font and overlay page information) supplied from the host computer 102 and compressed and printed data from the page memory 107. The page memory 107 stores a bit map image of one page on the basis of input data from the host computer 102.

A paper size to be processed in this laser printer is fixed to an A4 size. Therefore, a memory capacity of the page memory 107 is also fixed. The capacity of the page memory 107 will be referred to as a page memory size hereinafter.

The page save amount selection switch 108 is for selecting the upper limit of a capacity of compressed data of a page to be saved in the save memory 106 and constituted by, e.g., a rotary switch. By the page save amount selection switch 108, four positions of the page memory size×1 (=one page of A4 sheet), ×2 (=two pages of A4 sheet), ×3 (=three pages of A4 sheet), and ×4 (=four pages of A4 sheet) are set.

The timer circuit 109 outputs a timer interruption signal to the CPU 101 every 100 ms. By this timer interruption signal, a timer interruption process routine shown in FIG. 7 is activated.

The image signal generator 110 converts image data stored in the page memory 107 into an image signal and supplies the image signal to a printing unit 112 via the output I/F circuit 111 in accordance with a sync signal from the printing unit 112. The output I/F circuit 111 controls exchange of various control signals and image signals between the CPU 101, the image generator 110, and the printing unit 112.

The printing unit 112 realizes a series of printing processes of the laser printer such as feed of a sheet, generation of a laser beam, transfer and fixing of an image onto a sheet. When a jam occurs, the printing unit 112 detects jammed paper and transmits a detection signal as a status signal to the CPU 101 via the output I/F circuit 111.

Figure 2:
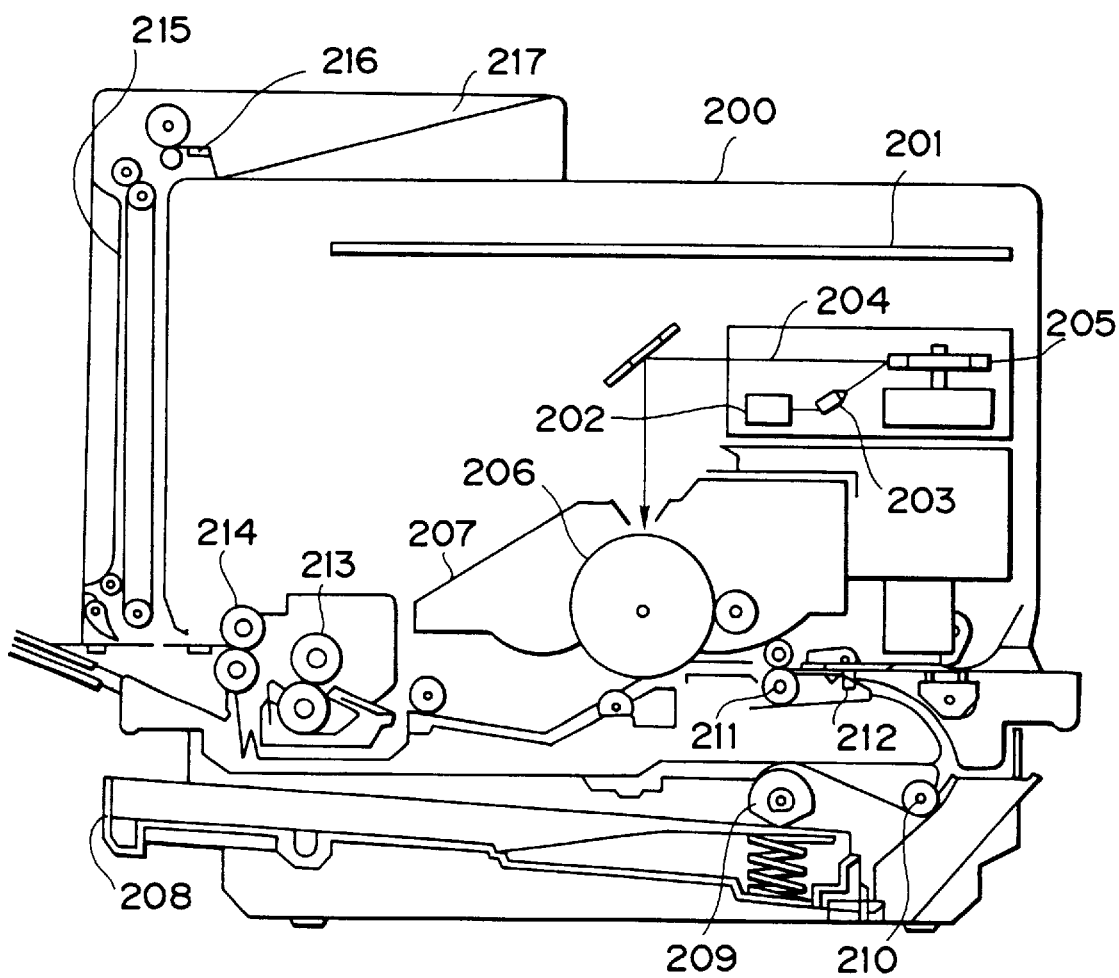
FIG. 2 is a schematic side view showing an internal arrangement of a printing unit of the embodiment.

FIG. 2 shows a schematic side view showing an interval arrangement of the printing unit 112.

A printed circuit board 201 including the above controller is arranged in a main body 200 of the laser printer. A laser driver 202 is a circuit for driving a semiconductor laser 203 and on/off-controls a laser beam 204 emitted from the semiconductor laser 203 in accordance with an input image signal.

The laser beam 204 is oscillated in a right-to-left direction by a rotary polygonal mirror 205 and radiated on an electrostatic drum 206, thereby forming a latent image of a character pattern or image information on the electrostatic drum 206. This latent image is developed by a development unit 207 located around the electrostatic drum 206 and then transferred onto a sheet. A4-size cut sheets stored in a paper cassette 208 mounted on the laser printer main body 200 are used as the recording sheets. Each sheet is fed in the apparatus and supplied to the electrostatic drum 206 by a feed roller 209 and conveyor rollers 210 and 211.

Sensors 212 and 216 are arranged for jam detection constituted by conventional photosensors. By the sensors 212 and 216, it is checked whether the sheet fed in the apparatus by the feed roller 209 reaches the jam sensor 212 within a predetermined time period or whether the sheet supplied toward the development unit 207 by the conveyor rollers 211 is fixed by a fixing roller 213 within a predetermined time and completely exhausted (or ejected) to an external paper stacker 217 by exit rollers 214 and an exit belt 215 through the jam sensor 216. If the sheet is jammed somewhere in this conveyor path, the printing unit is immediately stopped, and this information is supplied to the CPU 101. In this laser printer, a maximum of four pages of sheets may be jammed in the conveyor path from the feed roller 209 to the exit stacker 217. If a jam occurs, information of a corresponding page is processed in the control programs so as to always restore it in the save memory 106. Therefore, a page corresponding to the jammed sheet can be reprinted without resending data from the host computer 102.

Figure 3:
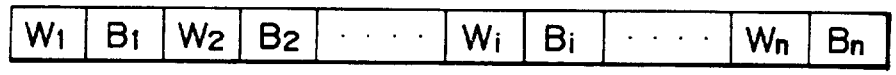
FIG. 3 is a schematic view showing a data compression system in the embodiment.

As described above, data in the page memory 107 which is already printed is compressed and stored in the save memory 106. FIG. 3 shows a data compression system.

In this embodiment, a so-called run-length system is adopted as the data compression system, continuous "0"s and continuous "1"s are alternately counted and stored for each bit map image in the page memory 107. Referring to FIG. 3, $W_i$ (i=1, 2, . . . ) represents "0", i.e., the number of white bits, and $B_i$ represents "1", i.e., the number of black bits. In this case, each of $W_i$ and $B_i$ is constituted by one byte. If "0" or "1" continues more than 255, a dummy byte of "1" or "0" is inserted. That is, in the case of $W_i$, $B_i=0$ is inserted after $W_i=255$ to obtain $W_{i+1}=X$.

FIG. 4 shows a data format of the work memory 105 utilized by the control programs and a relationship between the work memory 105 and the save memory 106.

The work memory includes a page save table 400, a next page pointer 410, a compress counter 411, a page capacity counter 412, and a page capacity set area 413.

The page save table 400 is a management table for saving data in the page memory 107 into the save memory 106 and has four table units in accordance with the maximum number of jammed sheets depending on the sheet conveyor path.

Each table unit is constituted by a time counter 401, a data length area 402, and a page pointer 403.

When image data in the page memory 107 is printed and compressed data of the printed image data is saved in the save memory 106, a time interval from the save timing to a timing at which a sheet is completely exhausted to the exhaust stacker 217 is set in the time counter 401. The time counter 401 is periodically decremented in the timer interruption process routine to check a page save end timing.

The data length area 402 is an area for storing a data capacity obtained when image data in the page memory 107 is compressed.

The page pointer 403 is an address pointer for representing a start address of the data compressed by the system as shown in FIG. 3 and saved in the save memory 106.

The save memory 106 is divided into predetermined unit segments so that an empty segment can be freely used. The compressed data from the page memory 107 is saved in an arbitrary position of an empty area of the save memory 106 and connected to the page save table 400 by the page pointer 403. Note that in FIG. 4, compressed data 420, 421, and 422 from the page memory 107 are represented by hatched portions.

The next page pointer 410 is for designating a unit of the page save table 400 to be set next. When printing of one page is finished, image data in the page memory 107 is compressed, a parameter value is set in each area of the unit designated by the next page pointer 410, and the next page pointer 410 advances to the next unit.

The compress counter 411 is a byte counter used when image data of the page memory 107 is to be compressed in accordance with the compression form. A final result of the compress counter 411 is set in the data length area 402 as a compressed data length.

The page capacity counter 412 is for counting a total data length of a plurality of compressed data currently stored in the save memory 106, in units of bytes.

The page capacity set area 413 is for storing the upper limit of a save amount of compressed data selected by the page save amount selection switch 108. The page capacity set area 413 converts the setting of the page save amount selection switch 108 into the number of bytes and then stores it.

A control operation performed in the laser printer having the above arrangement will be described below.

Figure 5:
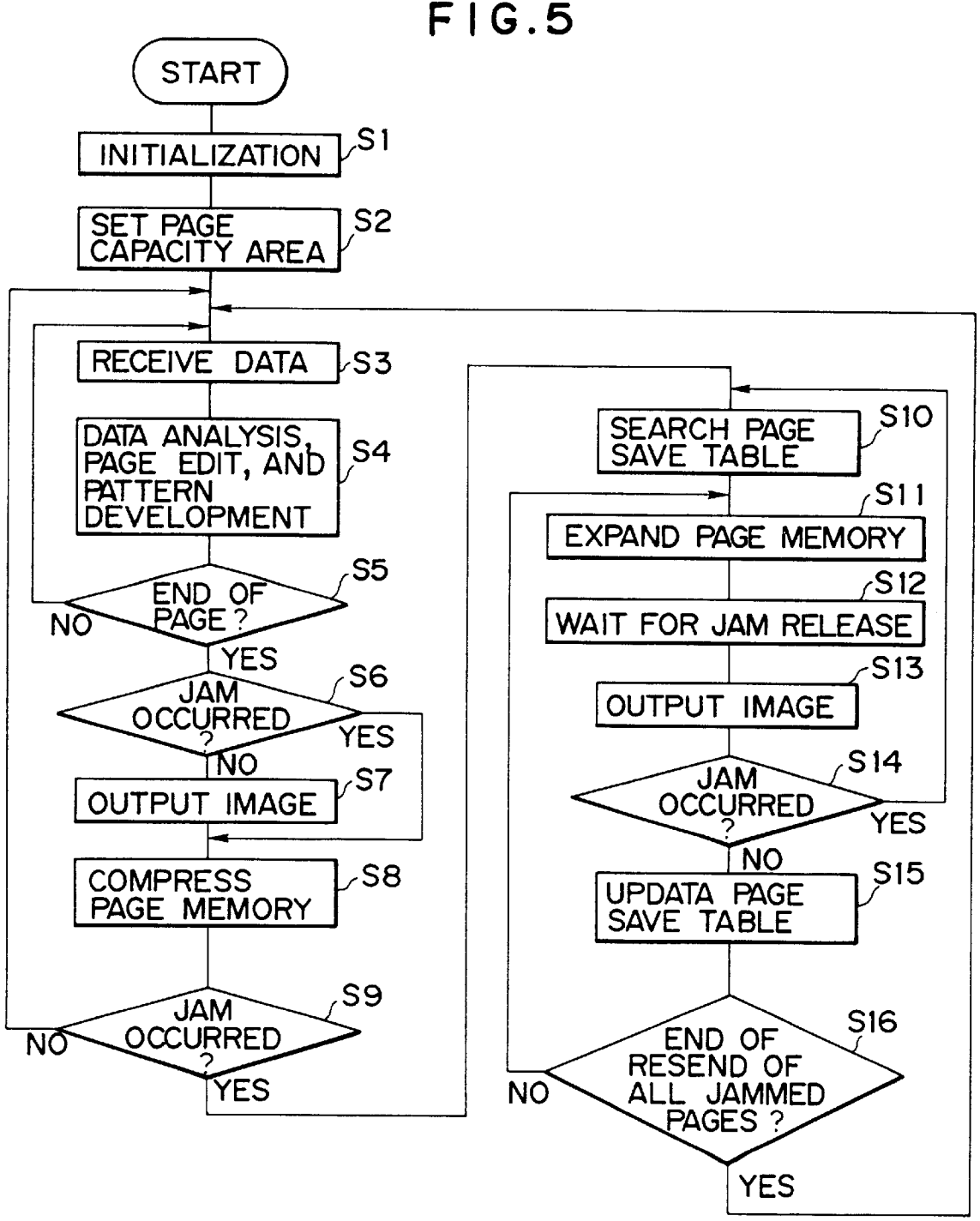
FIG. 5 is a flow chart for explaining a main routine of the control program in the embodiment.

FIG. 5 is a flow chart for explaining a main routine of the control programs of the CPU 101.

First, initialization of the entire laser printer is performed, i.e., the tables and the counters of the work memory 105 are reset and the save memory 106 is cleared (step S1).

The page save amount selection switch 108 is checked to set a corresponding set value in the page capacity set area 413 (step S2). The CPU 101 repeats a routine process from step S3. In this process, the CPU 101 receives data from the host computer 102 via the input I/F circuit 103 (step S3). The CPU 101 analyzes the reception data, extracts a corresponding character dot pattern from the ROM 104, and develops the pattern in the page memory 107 (step S4). The CPU 101 executes this page editing until it completely receives data of one page and prepares a one-page bit map image in the page memory 107 (step S5).

When preparation of the page memory 107 is completed, the CPU 101 checks whether a jam has occurred (step S6). If no jam has occurred, the CPU 101 supplies the image data in the page memory 107 to the image signal generator 110 and outputs the image signal to the printing unit 112 to execute a printing operation (step S7). Upon completion of this image output, the CPU 101 executes the page memory compression process (step S8) and checks whether a jam has occurred (step S9). If no jam has occurred, the flow returns to step S3, and processing for the next page is continuously performed.

If a jam has occurred in step S6 before image output, the page memory compression process is performed without performing image output (step S8), and the flow advances to the image data save process. If a jam has occurred in step S9 after image output, the flow advances to a process of re-outputting the compressed image data.

In this image data reoutputting process, the timer counters 401 of the page save table 400 are referred to to find out a unit of the page save table 400 having the smallest count, i.e., corresponding to the oldest one of a plurality of jammed sheets in the laser printer (step S10). Past page data remaining in the save memory 106 are re-printed from the above unit in an order of units in the page save table 400. Compressed data in the save memory 106 designated by the page pointer 403 is recovered to its original state by releasing the data compression system (step S11). After an operator removes the jammed sheets (step S12), the recovered data in the page memory 107 is printed (step S13). If a jam occurred again (step S14), the flow returns to step S10 to execute the process again.

The time counter 401 of the current unit of the current page save table 400 is initialized (step S15), and it is determined whether the resending of all jammed pages is completed (step S16). The flow then returns to step S3 to continues a process for a new page.

Figure 6:
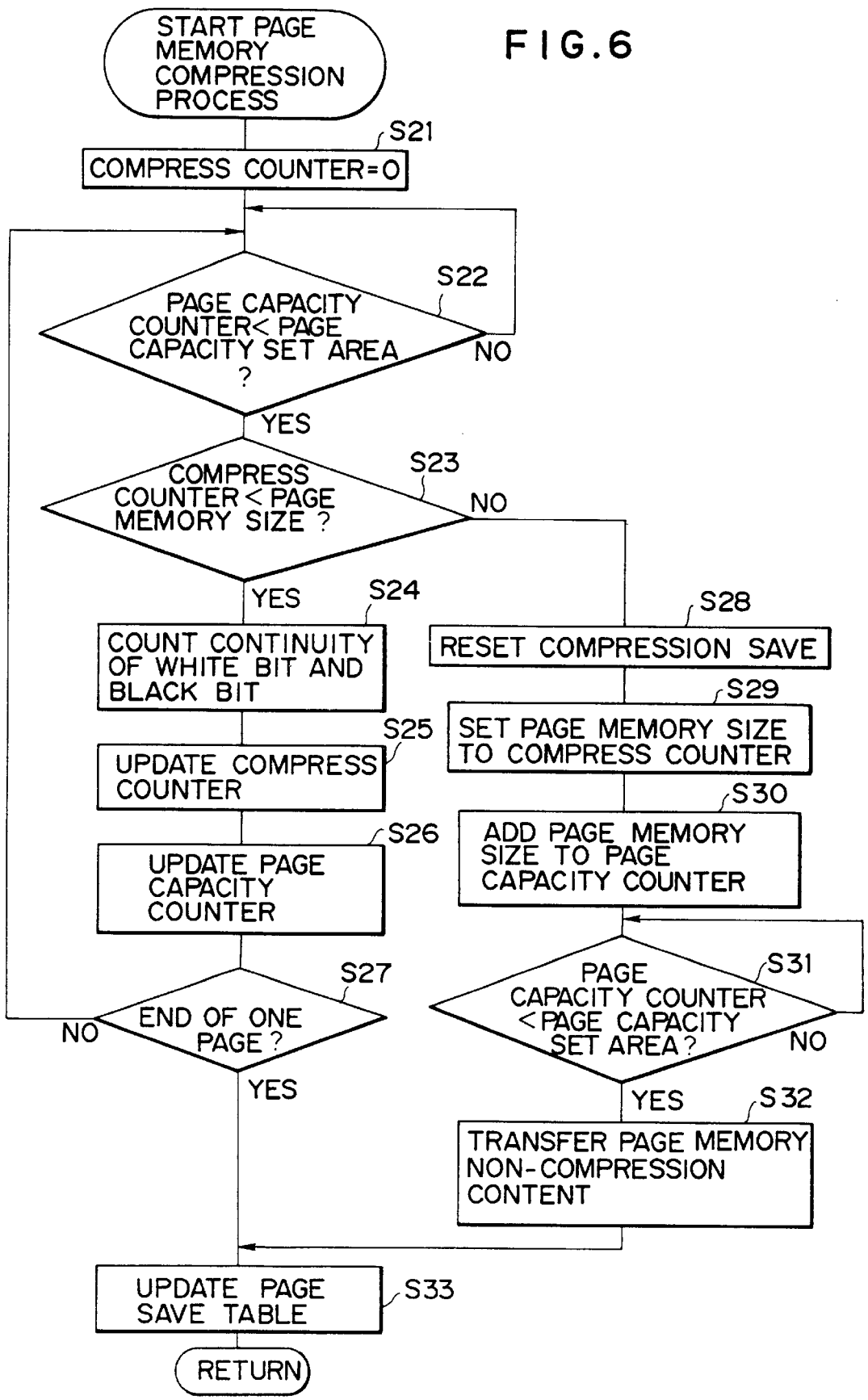
FIG. 6 is a flow chart for explaining a page memory compression process in the embodiment.

FIG. 6 is a flow chart for explaining in detail the page memory compression process in step S8.

The compress counter 411 is reset to be "0" (step S21). If the page capacity counter 412 reaches the value of the page capacity set area 413 (step S22), the following process is performed after the save memory 106 is emptied. Note that the save memory 106 is emptied by a timer interruption process routine to be described later when a predetermined time has elapsed.

If the page capacity counter 412 does not reach the value of the page capacity set area 413 (step S22), whether the compress counter 411 reaches the page memory size is checked (step S23). If the compress counter 411 does not reach the page memory size, the compression process is continuously executed. Continuity of white and black bits at a current position of the page memory 107 is counted, and $W_i$ and $B_i$ are set in the save memory 106 in accordance with the data compression system (step S24). The compress counter 411 is updated by two bytes (step S25), and the page capacity counter 412 is updated by two bytes (step S26). This operation is repeatedly performed for all areas in the page memory 107. If a process for one page is ended (step S27), a time interval up to a timing at which a page subjected to the compression process is completely exhausted is set in the time counter 401 of a unit in the page save table 400 designated by the next page pointer 410. In addition, the value of the compress counter is set in the corresponding data length area 402, and a start address of the save memory 106 in which the compressed data is saved is set in the corresponding page pointer 403. The page pointer 410 is updated for the next unit, and the page memory compression process is ended (step S33).

If the value of the compress counter 411 reaches the page memory size in step S23, this means that the data compression form of this laser printer has no compressing effect on the current image data of the page memory. Therefore, a compression stop process is performed.

Compressed data which is currently, partially formed in the save memory 106 is cleared (step S28), the page memory size is stored in the compress counter 411 (step S29), and the page memory size is added in the page capacity counter 412 (step S30). After the save memory 106 is emptied (step S31), a non-compression content of the page memory 107 is copied in the empty area of the save memory (step S32), and the flow advances to step S33 to end the page memory compression process.

FIG. 7 is a flow chart for explaining the timer interruption process routine periodically executed by the timer interruption signal described above.

If it is determined that the above jam release process is not executed (step S41), the values of the time counters 401 of all the units in the page save table 400 are reduced by one each (step S42). If the value of the time counter 401 of any unit reaches "0" in step S43, this means that a corresponding page is completely exhausted from the laser printer main body and page save becomes unnecessary. Therefore, a memory area in the save memory 106 corresponding to the compressed data 420 is opened (step S44), and the page capacity counter 412 is reduced by the number of bytes corresponding to the data length area 402 (step S45).

When it is confirmed that all the units of the page save table 400 are checked, the interrupt process is completed (S46).

If the time counter 401 does not reach "0", the corresponding unit is not processed, and the flow advances to step S46.

As described above, in the printing apparatus, an operator can arbitrarily select the upper capacity limit of page compressed data to be saved in the save memory 106 by the page save amount selection switch 108. When the save memory 106 has an empty area, this area can be used as a registration area for not only compressed data from the page memory but also page overlay data including, e.g., down load data of a font input from a host computer or ruled line information used for overlapping pages, or as a font cache if a vector font is used as a down load font.

Therefore, when the capacity of the save memory 106 is insufficient, assignment of the save memory 106 can be performed in accordance with whether data registration is to be performed or image data save is performed to increase the printing speed.

In particular, the font cache functions to convert a vector font into a dot pattern and stores the dot pattern in the work memory in accordance with a use frequency, thereby increasing the speed of bit pattern image formation in the page memory. In this case, although a larger memory capacity is preferable, the font cache can operate suitably with a small capacity. In addition, when the dot pattern of the font cache is erased in order to use the memory for another purpose, the dot pattern can be reproduced. As described above, when information temporarily present in the memory or information which can be reproduced after it is erased is set together with the save area for image data in the same memory, it is very important to switch the image data save area in accordance with an application selected by an operator. That is, a printing efficiency obtained when the image data save area is increased largely differs from that obtained when it is decreased. From this point of view, an effect of the page save amount selection switch is very significant.

In the above embodiment, the present invention is applied to the laser beam printer. However, the present invention can be similarly applied to an LED printer or ink-jet printer.

In the above embodiment, the paper size is fixed to the A4 size. However, a plurality of paper sizes can be adopted by using paper cassettes of various sizes. In this case, since the page size to be used largely changes in accordance with the paper size, the function of the present invention of selecting a suitable page memory save amount in accordance with the purpose of an operator becomes more effective.

In the above embodiment, the page save amount selection switch is used to select a page memory save amount. However, the page memory save amount can be set by command data from a data source such as a host computer. In this case, a suitable set value can be supplied to the printing apparatus in accordance with the state of print data or registration data generated by the data source.

In the above embodiment, page data is saved to perform re-printing upon jamming. However, data analysis can be performed while images of a preceding page and a page preceding by two are output, thereby sequentially saving page data. As a result, in an apparatus in which the performance of a control unit is relatively higher than that of a printing unit, a print execution speed can be increased.

In the above embodiment, page data is saved by performing data compression of the page memory. However, if a process system is simple and a memory capacity is sufficient, a bit map image can be directly saved.

In the above embodiment, page data subjected to page edit is a bit map image of one page. However, the page data may be edited in units of pages as code information. In this case, a page memory for storing image data as in the above embodiment need not be used, but page data of a plurality of code bases can be directly saved in the save memory.

As has been described in detail above, according to the present invention, since a save capacity of an area for saving page data can be arbitrarily set by the setting means, the remaining save area can be used to store other information, thereby effectively utilizing the save area.

The present invention is not limited to the above embodiment but can be variously modified within the scope of the appended claims.

What is claimed is:

1. An output apparatus comprising:
    generating means for generating a pattern based on coded information input from an information processing apparatus to generate bit image data;
    transmitting means for transmitting the bit image data to an output device so as to output the bit image data;
    compressing means for compressing the bit image data generated by said generating means after transmitting the bit image data to the output device and before determining whether an error has occurred in the output device; and
    determining means for determining whether an error occurs in the output device,
    wherein when said determining means determines that an error occurs, said compressing means compresses the bit image data without transmitting the bit image data to the output device after the coded information has been input by one page.

2. An apparatus according to claim 1, wherein the bit image data generated by said generating means is at least one page of bit image data.

3. An output method comprising the steps of:
    generating a pattern on a basis of coded information input from an information processing apparatus and generating bit image data; and
    compressing the bit image data generated in said generating step after transmitting the bit image data to an output device and before determining whether an error has occurred in the output device.

4. A method according to claim 3, wherein the bit image data generated in said generating step is at least one page of bit image data.

5. An apparatus according to claim 1, further comprising storing means for storing the data compressed by said compressing means.

6. An apparatus according to claim 1, wherein the output device is a printer engine.

7. An apparatus according to claim 5, further comprising decompressing means for decompressing the compressed data stored in said storing means.

8. A method according to claim 3, further comprising the step of storing in a memory the data compressed in said compressing step.

9. A method according to claim 3, wherein the output device is a printer engine.

10. A method according to claim 8, further comprising the step of decompressing the compressed data stored in the memory.

11. A printer for generating output data based on coded data input from an information processing apparatus and for printing the output data, said printer comprising:
    a printer engine for printing the generated output data;
    a processor for compressing the generated output data after outputting the output data to said printer engine and before determining whether an error has occurred in said printer engine; and
    a memory for storing the compressed output data,
    wherein the generated output data is image data,
    wherein said processor discriminates whether an error occurs in said printer engine before outputting the generated image data to said printer engine, and
    wherein when said processor determines that an error occurs in said printer engine, said processor compresses the generated image data without outputting the image data to said printer engine after the coded data has been input by one page.

12. A printer according to claim 11, wherein the input data is character code.

13. A printer according to claim 12, wherein the generated output data is image data.

14. A printer according to claim 11, wherein the generated output data is image data, and said processor compresses the generated image data after outputting the image data to said printer engine when said processor determines that no error occurs in said printer engine.

15. An output method comprising the steps of:
generating image data based on code data from an information processing apparatus;
compressing the generated image data after outputting the generated image data to a printer engine and before determining whether an error has occurred in the printer engine; and
storing the compressed image data.

16. A method according to claim 15, further comprising the step of discriminating whether an error occurs in the printer engine before outputting the generated image data to the printer engine.

17. A method according to claim 16, wherein said compressing step compresses the generated image data without outputting the image data to the printer engine when said discriminating step discriminates that an error occurs in the printer engine.

18. A method according to claim 16, wherein said compressing step compresses the generated image data after outputting the image data to the printer engine when said discriminating step discriminates that no error occurs in the printer engine.

19. An output apparatus comprising:
generating means for generating a pattern based on coded information input from an information processing apparatus to generate bit image data;
compressing means for compressing the bit image data generated by said generating means after transmitting the bit image data to an output device;
storing means for storing the bit image data compressed by said compressing means; and
determining means for determining whether an error occurs in the output device,
wherein when said determining means determines that an error occurs, said compressing means does not output the compressed bit image data to the output device, while when said determining means determines that no error occurs, said compressing means outputs the compressed bit image data to the output device and said storage means holds therein the compressed image data as output.

20. An output apparatus according to claim 19, wherein when the error determined by said determining means is removed, the compressed bit image data already output to the output device and held in said storing means, which corresponds to a page as incompletely printed, is decompressed and outputted to the output device again.

21. An output apparatus according to claim 20, wherein after the bit image data output to the output device is completely printed, the bit image data held in said storing means is released.

22. An output apparatus according to claim 20, wherein when said determining means determines that an error occurs while the coded information is input from the information processing apparatus, the bit image data is developed based on the coded information after the coded information has been input, the bit image data is compressed by said compressing means, and the compressed bit image data is stored in said storing means.

23. An output method comprising the steps of:
generating a pattern based on coded information input from an information processing apparatus to generate bit image data;
compressing the bit image data generated in said generating step after transmitting the bit image data to an output device;
storing the bit image data compressed in said compressing step; and
determining whether an error occurs in the output device,
wherein when it is determined in said determining step that an error has occurred, the compressed bit image data is not output in said compressing step to the output device, while when it is determined in said determining step that no error occurs, the compressed bit image data is output, and the compressed image data as output is stored in said storing step.

24. An output method according to claim 23, wherein when it is determined in said determining step that an error has been removed, the compressed bit image data already output to the output device is held in a storing device, which corresponds to a page as incompletely printed, and said output method includes a further step of decompressing and outputting the bit image data again to the output device.

25. An output method according to claim 24, wherein after the bit image data output to the output device is completely printed, the bit image data stored in said storing step is released.

26. An output method according to claim 24, wherein when it is determined in said determining step that an error occurs while the coded information is input from the information processing apparatus, the bit image data is developed based on the coded information after the coded information has been input, the bit image data is compressed in said compressing step, and the compressed bit image data is stored in said storing step.

27. An output apparatus comprising:
generating means for generating a pattern based on coded information input from an information processing apparatus to generate bit image data;
transmitting means for transmitting the bit image data to an output device so as to output the bit image data;
compressing means for compressing the bit image data generated by said generating means; and
determining means for determining whether an error occurs in the output device,
wherein when said determining means determines that an error occurs, said compressing means compresses the bit image data without transmitting the bit image data to the output device, and
wherein when said determining means does not determine that an error occurs, said compressing means compresses the bit image data after transmitting the bit image data to the output device.

28. An apparatus according to claim 27, wherein the bit image data generated by said generating means is at least one page of bit image data.

29. An apparatus according to claim 27, further comprising storing means for storing the data compressed by said compressing means.

30. An apparatus according to claim 27, wherein the output device is a printer engine.

31. An apparatus according to claim 29, further comprising decompressing means for decompressing the compressed data stored in said storing means.

32. An apparatus according to claim 27, further comprising determining means for determining whether an error occurs in the output device before transmitting the bit image data to the output device.

33. An apparatus according to claim 32, wherein when said determining means determines that an error occurs, said compressing means compresses the bit image data without transmitting the bit image data to the output device, while when said determining means determines that no error occurs, said compressing means compresses the bit image data after transmitting the bit image data to the output device.

34. An output method comprising the steps of:
generating image data based on code data from an information processing apparatus;
compressing the generated image data; and
storing the compressed image data,
wherein when said compressing step compresses the generated image data after outputting the generated image data to a printer engine, and
wherein said compressing step compresses the generated image data before determining whether an error has occurred in the printer engine.

35. An output apparatus comprising:
generating means for generating a pattern based on coded information input from an information processing apparatus to generate bit image data;
compressing means for compressing the bit image data generated by said generating means;
storing means for storing the bit image data compressed by said compressing means; and
determining means for determining whether an error occurs in an output device,
wherein said compressing means compresses the bit image data generated by said generating means before said determining means determines whether an error occurs in the output device, and
wherein when said determining means determines that an error occurs, said compressing means does not transmit the compressed bit image data to the output device, while when said determining means determines that an error does not occur, said compressing means decompresses the compressed bit image data to transmit the compressed bit image to the output device.

36. An output apparatus according to claim 35, wherein when the error of which the occurrence has been determined by said determining means is released, the bit image data, already transmitted to the output device, which corresponds to pages not completely printed out and is stored in said storing means, is decompressed to re-transmit to the output device.

37. An output apparatus according to claim 35, wherein when said determining means determines that an error has occurred during input of the coded information from the information processing apparatus, the bit image data is developed, after completion of the input of the coded information, based on the coded information, and the developed bit image data is compressed by said compressing means, and the compressed bit image data is stored in said storing means.

38. An output apparatus according to claim 35, wherein the error in the output device to be determined by said determining means is a jam.

39. An output apparatus according to claim 35, wherein the bit image data to be compressed by said compressing means has a capacity of one page.

40. An output method comprising the steps of:
generating a pattern based on coded information input from an information processing apparatus to generate bit image data;
compressing the bit image data generated in said generating step;
storing the bit image data compressed in said compressing step;
determining whether an error occurs in an output device,
wherein, in said compressing step, the bit image data generated in said generating step is compressed before the determining step determines whether an error occurs in the output device, and
wherein, when said determining step determines that an error occurs, the bit image data compressed in said compressing step is not transmitted to the output device, while when said determining step determines that an error has not occurred, the bit image data compressed in said compressing step is decompressed and transmitted to the output device.

41. An output method according to claim 40, wherein when the error whose occurrence has been determined in said determining step is released, the bit image data, already transmitted to the output device, which corresponds to pages not completely printed out and which is stored in said storing step, is decompressed to re-transmit to the output device.

42. An output method according to claim 40, wherein when said determining step determines that an error has occurred during input of the coded information from the information processing apparatus, the bit image data is developed, after completion of the input of the coded information, based on the coded information, and the developed bit image data is compressed in said compressing step, and the compressed bit image data is stored in said storing step.

43. An output method according to claim 40, wherein the error in the output device determined in said determining step is a jam.

44. An output method according to claim 40, wherein the bit image data to be compressed in said compressing step has a capacity of one page.

45. A memory medium usable in a computer apparatus, a program stored on said memory medium comprising the steps of:
generating a pattern based on coded information input from an information processing apparatus to generate bit image data;
compressing the bit image data generated in said generating step;
storing the bit image data compressed in said compressing step;
determining whether an error occurs in an output device,
wherein, in said compressing step, the bit image data generated in said generating step is compressed before the determining step determines whether an error occurs in the output device, and
wherein, when said determining step determines that an error occurs, the bit image data compressed in said compressing step is not transmitted to the output device, while when said determining step determines that an error has not occurred, the bit image data compressed in said compressing step is decompressed and transmitted to the output device.

46. A memory medium according to claim 45, wherein when the error whose occurrence has been determined in said determining step is released, the bit image data, already transmitted to the output device, which corresponds to pages not completely printed out and which is stored in said storing step, is decompressed to re-transmit to the output device.

47. A memory medium according to claim 45, wherein when said determining step determines that an error has occurred during input of the coded information from the information processing apparatus, the bit image data is developed, after completion of the input of the coded information, based on the coded information, and the developed bit image data is compressed in said compressing step, and the compressed bit image data is stored in said storing step.

48. A memory medium according to claim 45, wherein the error in the output device determined in said determining step is a jam.

49. A memory medium according to claim 45, wherein the bit image data to be compressed in said compressing step has a capacity of one page.

* * * * *

UNITED STATES PATENT AND TRADEMARK OFFICE
CERTIFICATE OF CORRECTION

PATENT NO. : 5,822,505
DATED : October 13, 1998
INVENTOR(S) : Kunio Okada

It is certified that error appears in the above-identified patent and that said Letters Patent is hereby corrected as shown below:

Column 5,
Line 52, "continues" should read -- continue --.

Column 7,
Line 40, "two" should read -- two pages --.

Signed and Sealed this

Thirtieth Day of October, 2001

Attest:

Nicholas P. Godici

NICHOLAS P. GODICI
Attesting Officer
Acting Director of the United States Patent and Trademark Office